(12) United States Patent
Edmondson

(10) Patent No.: US 8,382,142 B2
(45) Date of Patent: Feb. 26, 2013

(54) MOTORCYCLE TRAILER

(76) Inventor: James B. Edmondson, Manistee, MI (US)

( * ) Notice: Subject to any disclaimer, the term of this patent is extended or adjusted under 35 U.S.C. 154(b) by 65 days.

(21) Appl. No.: 13/108,358

(22) Filed: May 16, 2011

(65) Prior Publication Data
US 2012/0153596 A1 Jun. 21, 2012

Related U.S. Application Data

(60) Provisional application No. 61/423,902, filed on Dec. 16, 2010.

(51) Int. Cl.
*B60P 3/06* (2006.01)
(52) U.S. Cl. ............... 280/402; 280/416.1; 414/462; 414/463; 414/482; 296/184.1; 296/186.4; 296/185.1; 296/186.1
(58) Field of Classification Search .............. 280/402, 280/416.1; 414/462, 463, 482; 296/184.1, 296/186.4, 185.1, 186.1
See application file for complete search history.

(56) References Cited

U.S. PATENT DOCUMENTS

| 4,032,167 | A | * | 6/1977 | Chereda | 410/3 |
| 5,674,044 | A | * | 10/1997 | Ranes | 414/563 |
| 5,794,959 | A | * | 8/1998 | Scheef, Jr. | 280/400 |
| 5,924,836 | A | * | 7/1999 | Kelly | 414/482 |
| 5,984,339 | A | * | 11/1999 | Guild | 280/402 |
| 7,694,861 | B1 | * | 4/2010 | Neely | 224/537 |
| 2006/0152040 | A1 | * | 7/2006 | Wiebe et al. | 296/185.1 |

* cited by examiner

*Primary Examiner* — Lesley D Morris
*Assistant Examiner* — Marlon Arce
(74) *Attorney, Agent, or Firm* — Robert L. Stearns; Dickinson Wright, PLLC

(57) ABSTRACT

A trailer which is sized to be towed behind a motorcycle. The trailer includes a cargo bay for storing luggage, spare parts, tools or other cargo. The trailer is preferably towed behind a motorcycle in a group of motorcycles. In the unfortunate event that one of the motorcycles breaks down or a rider is unable to continue operating his or her motorcycle, the cargo bay can be converted to a towing configuration for towing the disabled motorcycle. This allows the group of motorcycles to continue riding, and the disabled motorcycle can be towed to a repair location at a more convenient time for the entire group of riders.

23 Claims, 14 Drawing Sheets

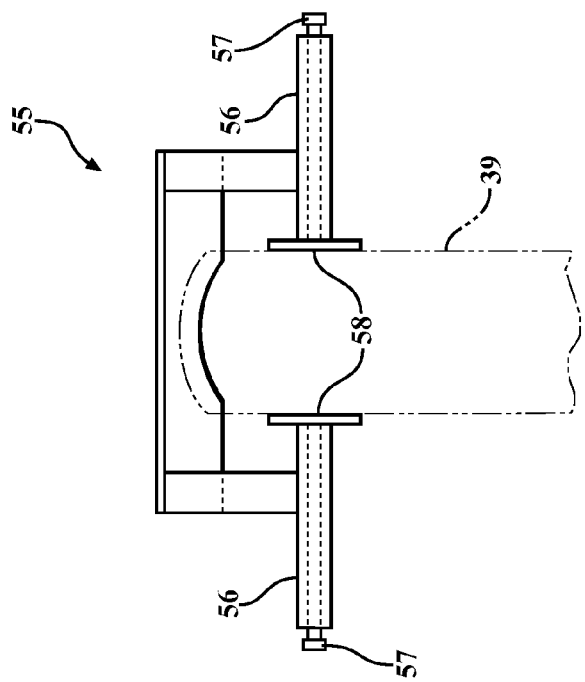
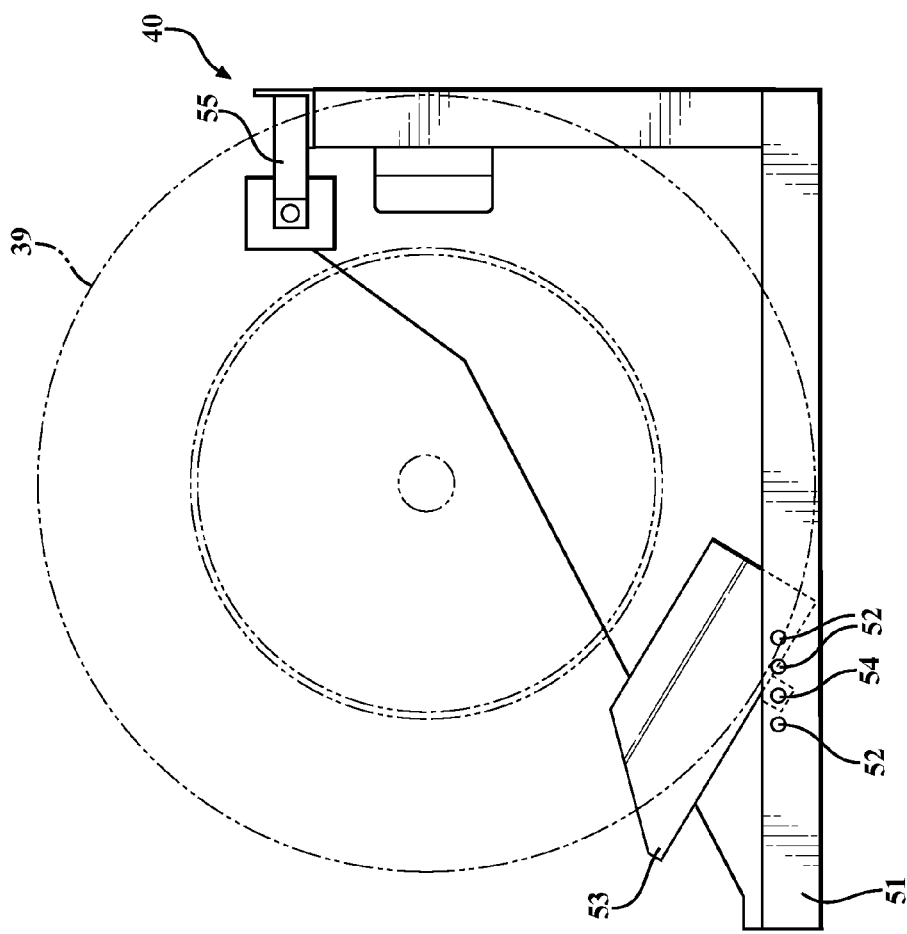
FIG. 12B
FIG. 12A

MOTORCYCLE TRAILER

CROSS REFERENCE TO RELATED APPLICATION

This application claims the benefit of provisional application Ser. No. 61/423,902 filed on Dec. 16, 2010.

BACKGROUND OF THE INVENTION

1. Field of the Invention

The present invention relates to trailers designed to tow a motorcycle by its front wheel.

2. Description of the Related Art

Motorcycle riding has become a popular recreational activity, and motorcyclists often travel great distances for recreational purposes. When riding recreationally, motorcyclists typically travel in groups for social as well as safety purposes, i.e. a group of motorcycles is more visible to other drivers on the road than an individual motorcycle. One drawback to riding long distances over multiple days is the necessity of storage space to store the luggage, spare parts and tools for such a trip. Even with the addition of saddle-packs, most motorcycles do not have adequate storage space for long rides. Further, most motorcyclists avoid carrying cargo in backpacks, which can cause undue fatigue and raise the center of gravity of the motorcycle and rider. A raised center of gravity is undesirable because it increases the risk of the motorcycle falling on its side. Some groups tow a dedicated cargo container behind one of the motorcycles to store luggage, spare parts, tools or other cargo for the entire group. Alternately, some motorcycle groups have a chase vehicle, or an automobile which follows the group during the ride and stores the group's cargo.

Motorcycle trips are often through long stretches of remote countryside and other destinations that are unfamiliar to the riders. If one of the motorcycles in the group breaks down or if a driver becomes ill or for whatever reason is unable to operate his or her motorcycle, it presents a problem for the whole group. The group must either split up with some riders continuing on and another group waiting behind, or all of the riders must wait until a tow truck arrives to tow the disabled bike away to a repair shop or a safe storage place. More time is then wasted by the group while the disabled bike is repaired. Under these circumstances, the entire group is at the mercy of the availability and timing of the towing and repair facilities. Alternatively, if the group has a chase vehicle following it, the chase vehicle could tow a dedicated motorcycle trailer for towing the disabled motorcycle to a towing and repair facility that is more convenient for the group. While this may be more convenient for the group in this unfortunate scenario, such a chase vehicle is undesirable for a number of reasons including cost and the fact that the driver of the chase vehicle is unable to enjoy the open road on his or her motorcycle.

SUMMARY OF THE INVENTION

The subject invention is a trailer, which is sized to be towed by a motorcycle, for storing cargo and for towing a motorcycle. The trailer includes a cargo bay having an enclosable interior, and the cargo bay is convertible between a cargo trailer configuration and a towing dolly configuration. When the cargo bay is in the cargo trailer configuration, luggage, spare parts, tools and other cargo can be stored in a primary cargo space in the interior of the cargo bay. When the cargo bay is in the towing dolly configuration, the front tire of a disabled motorcycle, can be positioned into the open interior of the cargo bay and secured to the trailer for towing. When the front tire of the disabled motorcycle is positioned in the cargo bay, it is elevated relative to the rear tire, which can spin freely to tow the motorcycle. When in the towing dolly configuration, the cargo which was in the primary cargo space, can instead be stored in an auxiliary cargo space.

In one aspect of the invention, the cargo bay includes a first portion and a second portion that are hingedly attached to one another for quick and easy conversion between the cargo trailer and towing dolly configurations. A ramp may also be positioned below the trailer. To convert the trailer from the cargo trailer configuration to the towing dolly configuration, a user rotates the first portion about the hinge to a position in front of the second portion and removes some or all of the cargo contained therein. The ramp is then positioned on an incline behind the trailer with one end engaging the trailer and the other end resting on the ground. The front tire of the disabled motorcycle is then wheeled into a towing location inside of the cargo bay. Once in the towing location, the disabled motorcycle is then secured to the trailer with one or more connection devices, and the ramp is returned to its stowed position beneath the trailer. The first and second portions of the cargo bay can alternatively be unhinged, and the first portion can be manually moved relative to the second portion to convert the trailer from the cargo trailer configuration to the towing dolly configuration.

All of the advantages of the chase vehicle with a dedicated motorcycle-towing trailer are wrapped up into a single trailer which can be towed behind one of the motorcycles in the group. When all of the motorcycles in the group are operating properly, the trailer is placed in the cargo trailer configuration, and the group's cargo is stored in the enclosed primary cargo space. Because the extra cargo weight is towed behind the motorcycle, it does not cause undue stress on any of the riders or raise the center of gravity of any of the motorcycles. In the event of an unfortunate breakdown that cannot be quickly repaired on the side of the road or when a rider is unable to continue riding his or her motorcycle, the trailer can be quickly converted to the towing dolly configuration, and the disabled motorcycle can be towed while the extra rider rides in tandem on one of the properly operating motorcycles. Thus, the entire group can continue to travel, and the disabled motorcycle can be towed to a repair shop at a time and location that is most convenient for all of the riders of the group.

The trailer can also be towed with a non-motorcycle vehicle, such as a car, a truck or a sport utility vehicle. Thus, the trailer can also be used by a single rider to tow his or her motorcycle from his home to, for example, a motorcycle convention. Thus, the trailer eliminates the need for a separate trailer dedicated to towing motorcycles.

According to a further aspect of the invention, the connection device of the trailer is at least one fastener made up of at least one turnbuckle and a collar that can be adjusted to secure virtually any motorcycle to the trailer. All of the components of the fastener are of metal, so there is no possibility of the components stretching or loosening as the motorcycle is towed around corners or across rough road conditions. The collar is secured directly to the handlebars of the disabled motorcycle to provide a positive connection that cannot slip loose, and the turnbuckle is coupled to the collar with an eyehook so that the connection cannot come loose. The turnbuckle can be turned in one direction to lengthen the fastener and another direction to shorten the fastener. When properly secured to the trailer with the fasteners, the disabled motorcycle is only able to lean just a small amount, if at all, when being towed around a corner or over rough road conditions. This adjustable fastener provides a very versatile and secure connection between the disabled motorcycle and the trailer.

According to yet a further aspect of the invention, the cargo bay includes a top portion, a bottom portion and a lid. When the trailer is in the cargo trailer configuration, the lid is nested onto the top portion, and a lock secures the top and bottom portions together. To convert the trailer to the towing dolly configuration, the lid is removed from the top portion, and the top portion is rotated relative to the bottom portion. The lid is then positioned onto the top portion to present an enclosed auxiliary cargo space for storing cargo that was in the primary cargo space. The same lock that secured the top and bottom portions together in the cargo trailer configuration can be used to secure the lid to the top portion and lock the auxiliary cargo space. Thus, cargo can be safely stored in the trailer regardless of whether the trailer is in the cargo trailer configuration or the towing dolly configuration.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 12A and 12B show side and front views, respectively, of the front tire of a motorcycle secured to the mounting shoe of the exemplary embodiment;

DETAILED DESCRIPTION OF THE ENABLING EMBODIMENTS

Referring to the Figures, wherein like numerals indicate corresponding parts throughout the several views, a trailer 20 for selectively storing cargo and towing a motorcycle 21 is generally shown in FIGS. 1-8, 11, 18 and 19. As will be described in further detail below, the trailer 20 is quickly convertible between a cargo trailer configuration, best shown in FIG. 3, for storing cargo and a towing dolly configuration, best shown in FIG. 6, for towing a disabled motorcycle 21. The trailer 20 is particularly advantageous when towed by a motorcycle in a group of motorcycles. When all of the motorcycles 21 are operating correctly, the trailer 20 can be used to store cargo (e.g. luggage, spare parts, tools, etc.) for the group of riders. Then, if one of the motorcycles 21 breaks down, or if one of the riders is unable to continue operating his or her motorcycle 21, the trailer 20 be quickly converted to the towing dolly configuration to tow the disabled motorcycle 21. The trailer 20 is adjustable to tow virtually any type or size of motorcycle 21.

Figure 1:
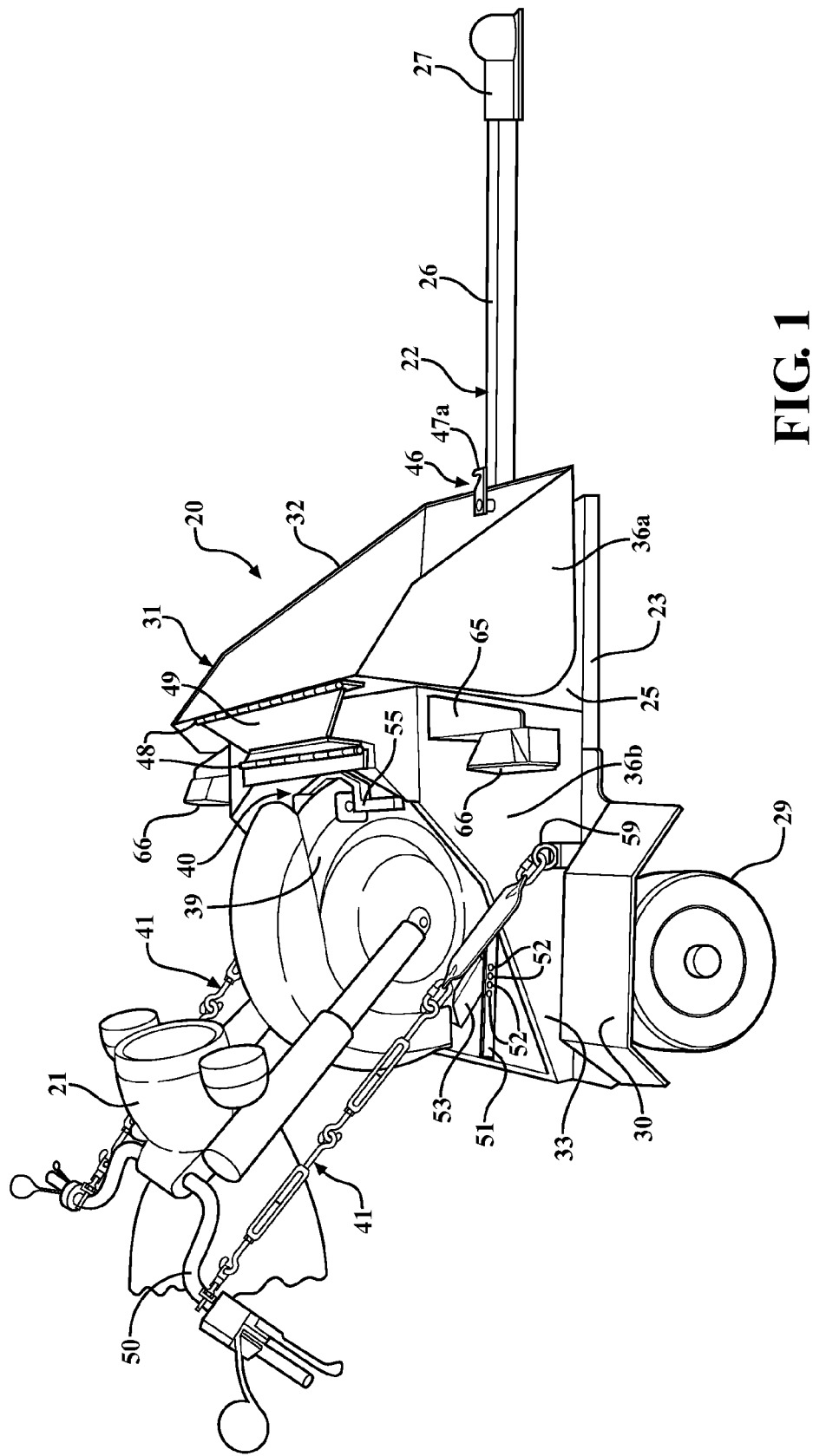
FIG. 1 is a perspective side view of the exemplary embodiment of the motorcycle trailer in a towing configuration with a motorcycle secured to the trailer.
Figure 2:
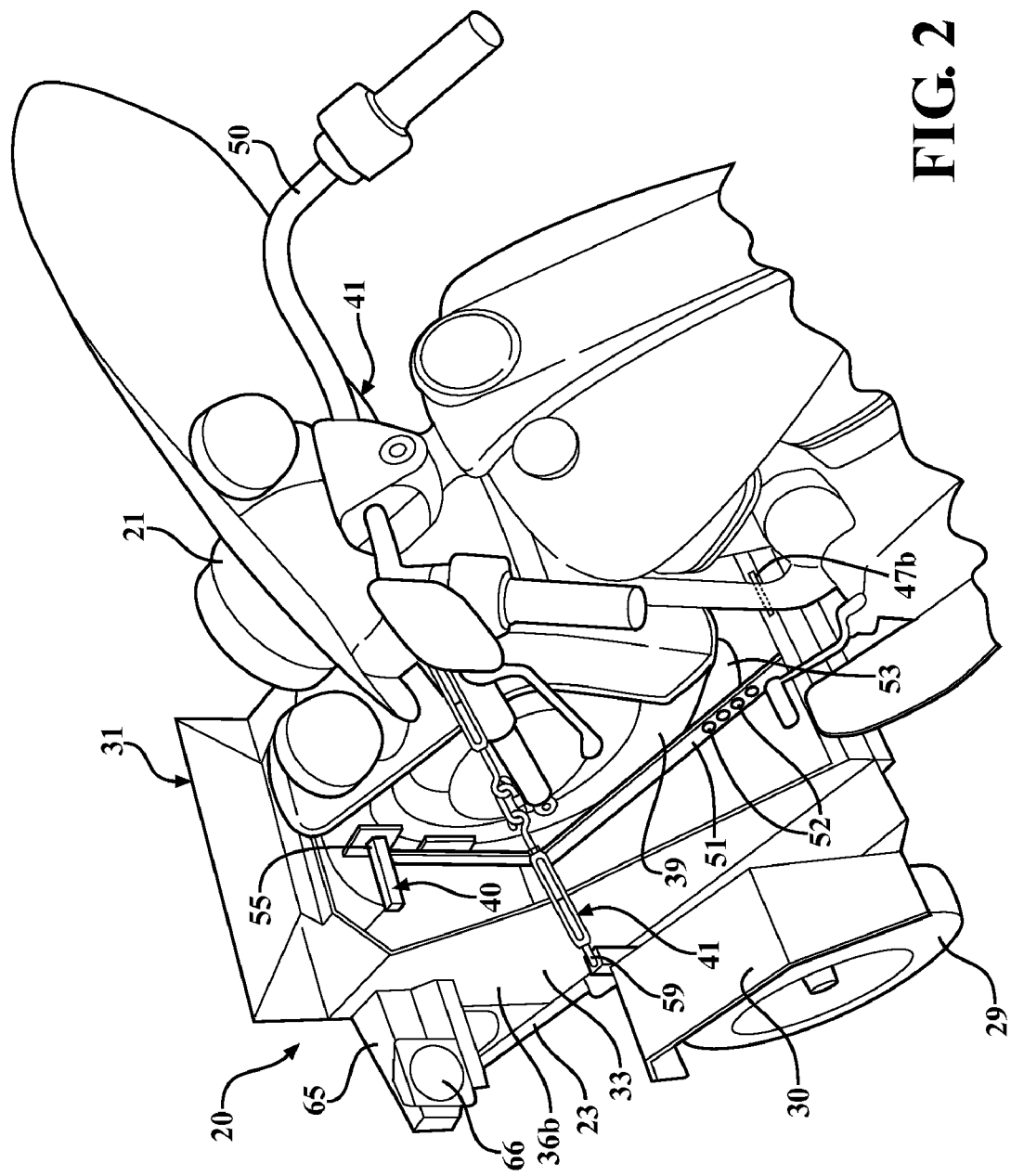
FIG. 2 is a fragmentary rear perspective view of the exemplary embodiment of the motorcycle trailer in a towing configuration with a motorcycle secured to the trailer.
Figure 5:
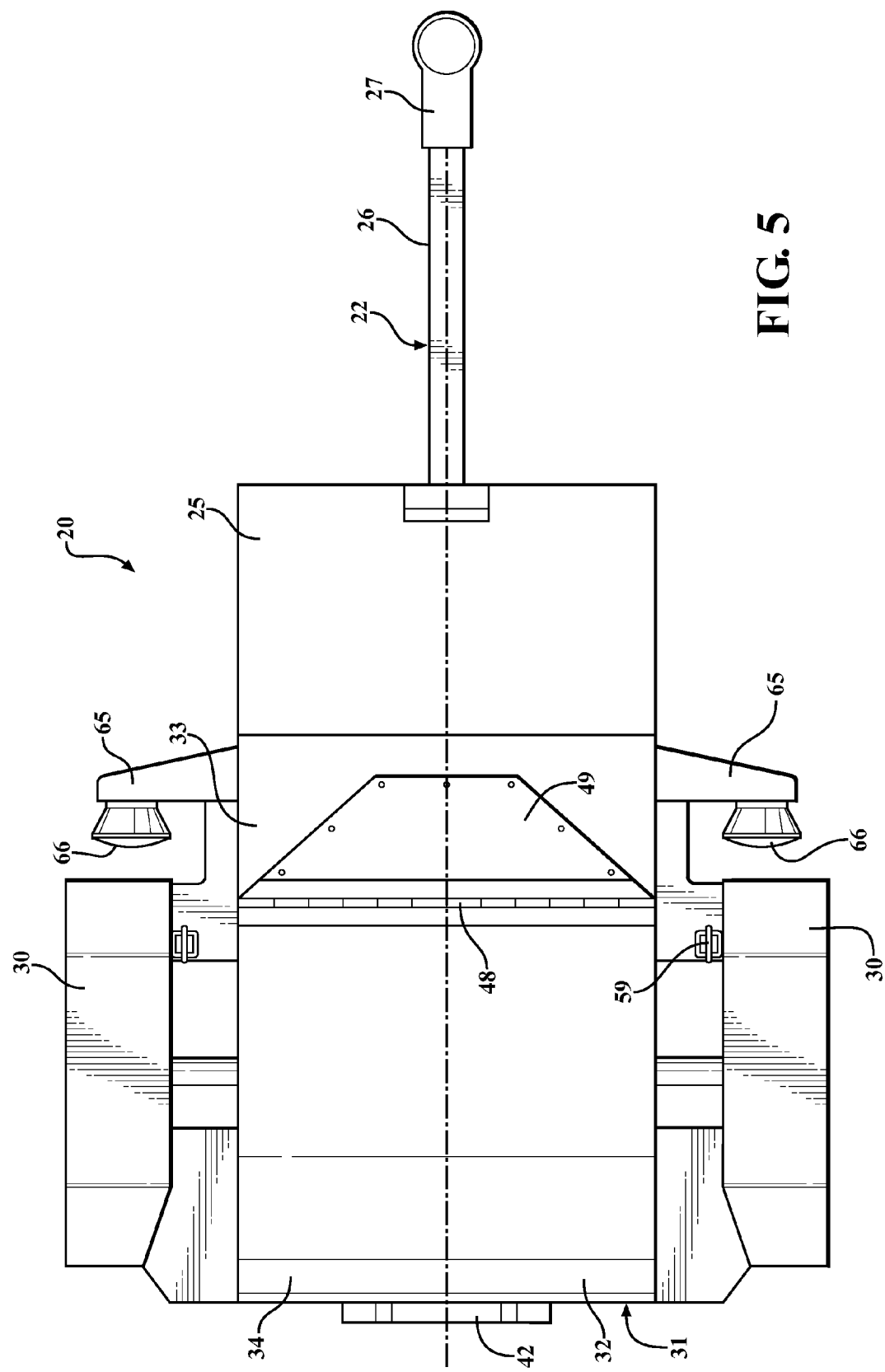
FIG. 5 is a top elevation view of the exemplary embodiment of the motorcycle trailer in the cargo configuration.
Figure 16:
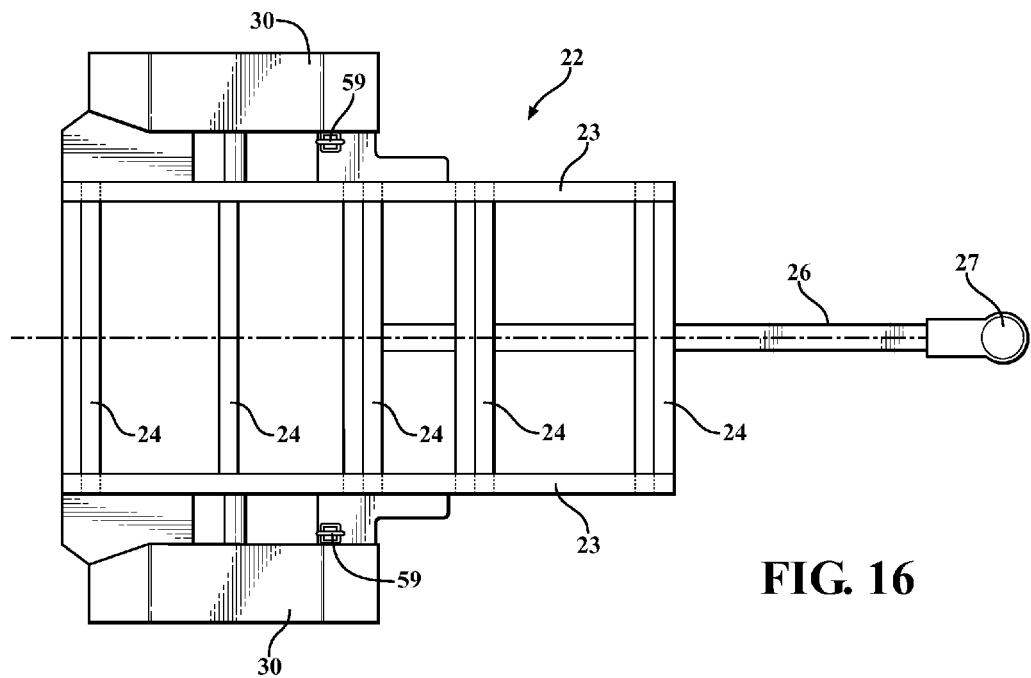
FIG. 16 is a top view of a frame of the exemplary embodiment of the motorcycle trailer.

The exemplary embodiments of the trailer 20 both include a structural frame 22, which is generally indicated in FIG. 1 and best shown in FIG. 16. The frame 22 includes a pair of side bars 23 extending in spaced and parallel relationship with one another and a plurality of cross-bars 24 extending in spaced and parallel relationship with one another between the side bars 23. As shown in FIG. 5, a generally flat floor 25 is disposed on top of the side bars 23 and cross-bars 24. A tongue 26 is interconnected with a plurality of the cross-bars 24 and extends in a forward direction to a distal end. A ball receiver 27 is disposed at the distal end for connecting the frame 22 to the trailer ball (not shown) of a vehicle. The vehicle could be an automobile (e.g. a car, a truck or a sport utility vehicle) or a motorcycle 21. The side bars 23, cross-bars 24 and tongue 26 of the frame 22 are preferably fabricated of stock metal pieces. However, it should be appreciated that the frame 22 could alternatively be made of other materials and it could take many designs other than the designs of the exemplary embodiments.

The exemplary embodiments each include a pair of axles 28 rotatably coupled to the frame 22 and extending outwardly therefrom on opposite sides. The axles 28 are preferably coupled to the frame 22 through at least one bearing (not shown). A wheel supporting a tire 29 is connected to each of the axles 28. In each of the exemplary embodiments, the trailer 20 further includes a fender 30 engaging the frame 22 adjacent to each of the wheels and framing the tires 29. Although not shown, it should be appreciated that the trailer 20 could additionally include a trailer braking system. Such a trailer braking system would assist the vehicle towing the trailer 20 in slowing the trailer 20.

A cargo bay 31, generally indicated, is disposed on the floor 25 of the trailer 20. The cargo bay 31 includes a first portion 32 and a second portion 33 enclosable against one another to present a primary cargo space when the trailer 20 is in the cargo trailer configuration. The first portion 32 is movable relative to the second portion 33 to present an open interior for receiving and elevating the front wheel and front tire 39 of a disabled motorcycle 21 when the trailer 20 is in the towing dolly configuration, as will be discussed in greater detail below.

Figure 3:
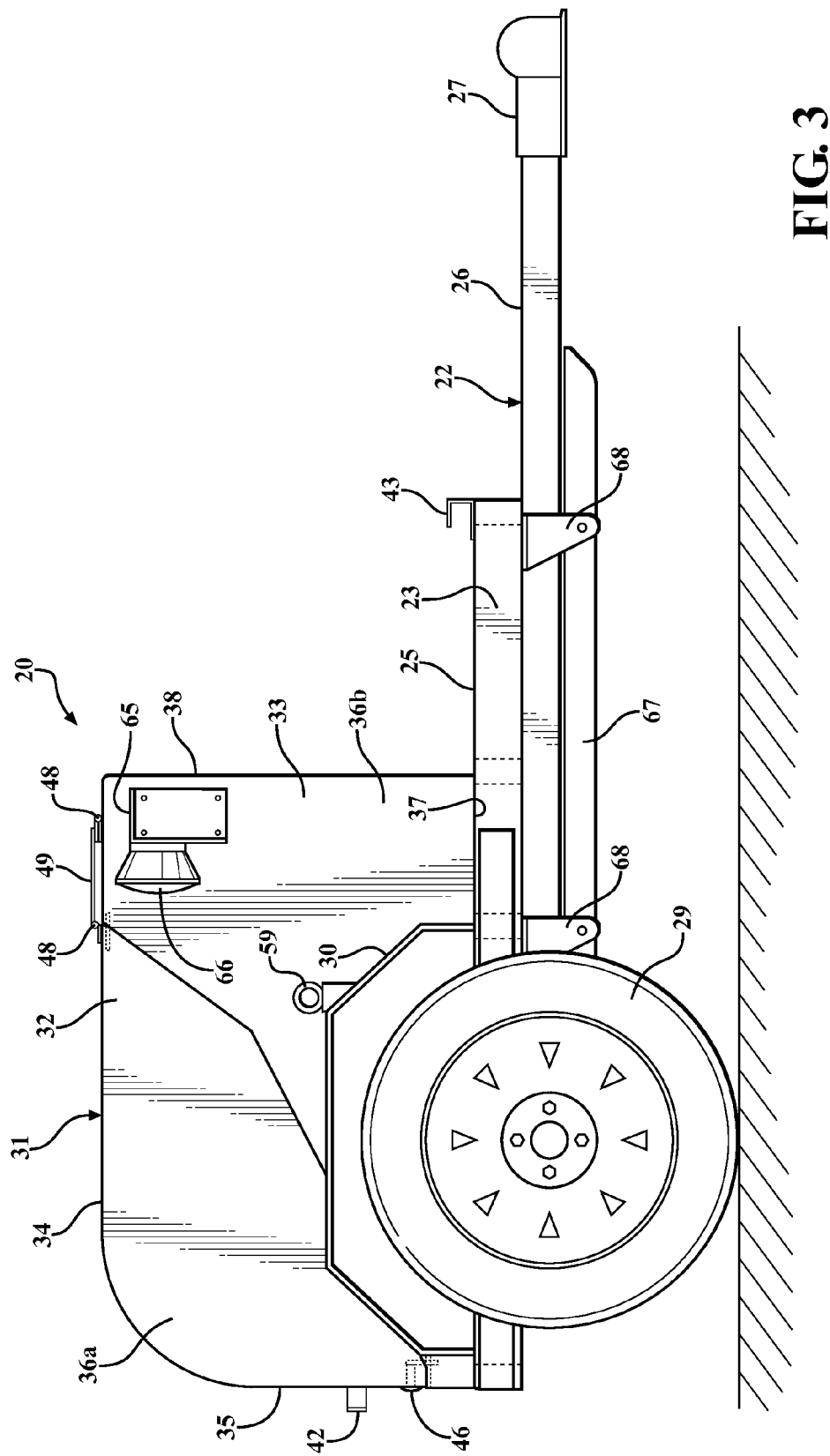
FIG. 3 is a side elevation view of the exemplary embodiment of the motorcycle trailer in a cargo configuration.
Figure 4:
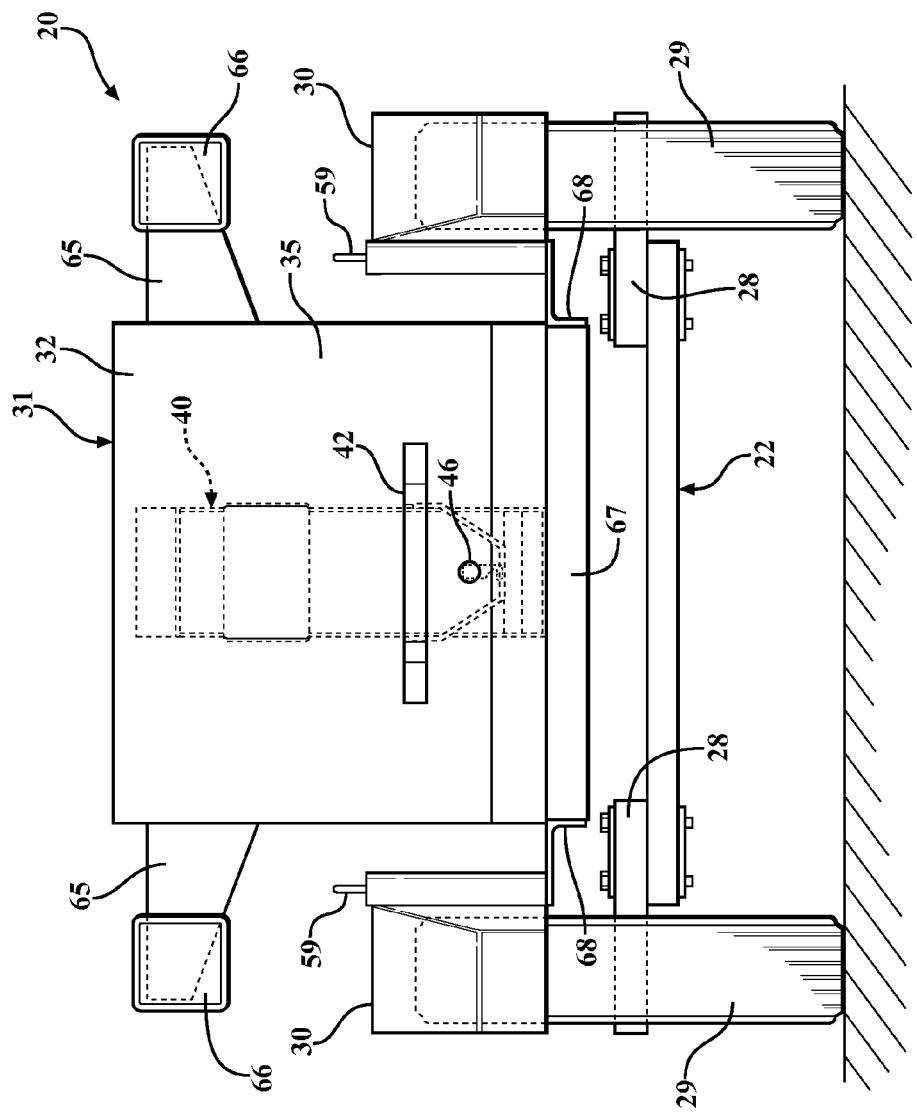
FIG. 4 is a rear elevation view of the exemplary embodiment of the motorcycle trailer in the cargo configuration.

In each of the exemplary embodiments, the first portion 32 of the cargo bay 31 is a top portion 32 and the second portion 33 is a bottom portion 33. Alternately, it should be appreciated that the second portion 33 could be the floor 25 of the trailer 20. The top portion 32 has a top wall 34, a back wall 35, a pair of opposing side walls 36a and an open bottom. The bottom portion 33 of the exemplary embodiment has a bottom wall 37 resting on the floor 25 of the trailer 20, a front wall 38, a pair of opposing side walls 36b and an open top. The opposing side walls 36a, 36b of the top and bottom portions 32, 33 are spaced similarly for mating with one another to define an enclosed interior. As shown in FIG. 3, the bottom portion 33 of the cargo bay 31 is shorter than the length of the floor 25, and the cargo bay 31 is positioned adjacent the back of the trailer 20. The cargo bay 31 is preferably fabricated of sheet metal. However, it should be appreciated that the cargo bay 31 could be made of a variety of other materials, e.g. plastics, fiberglass, composites, wood, etc.

Figure 6:
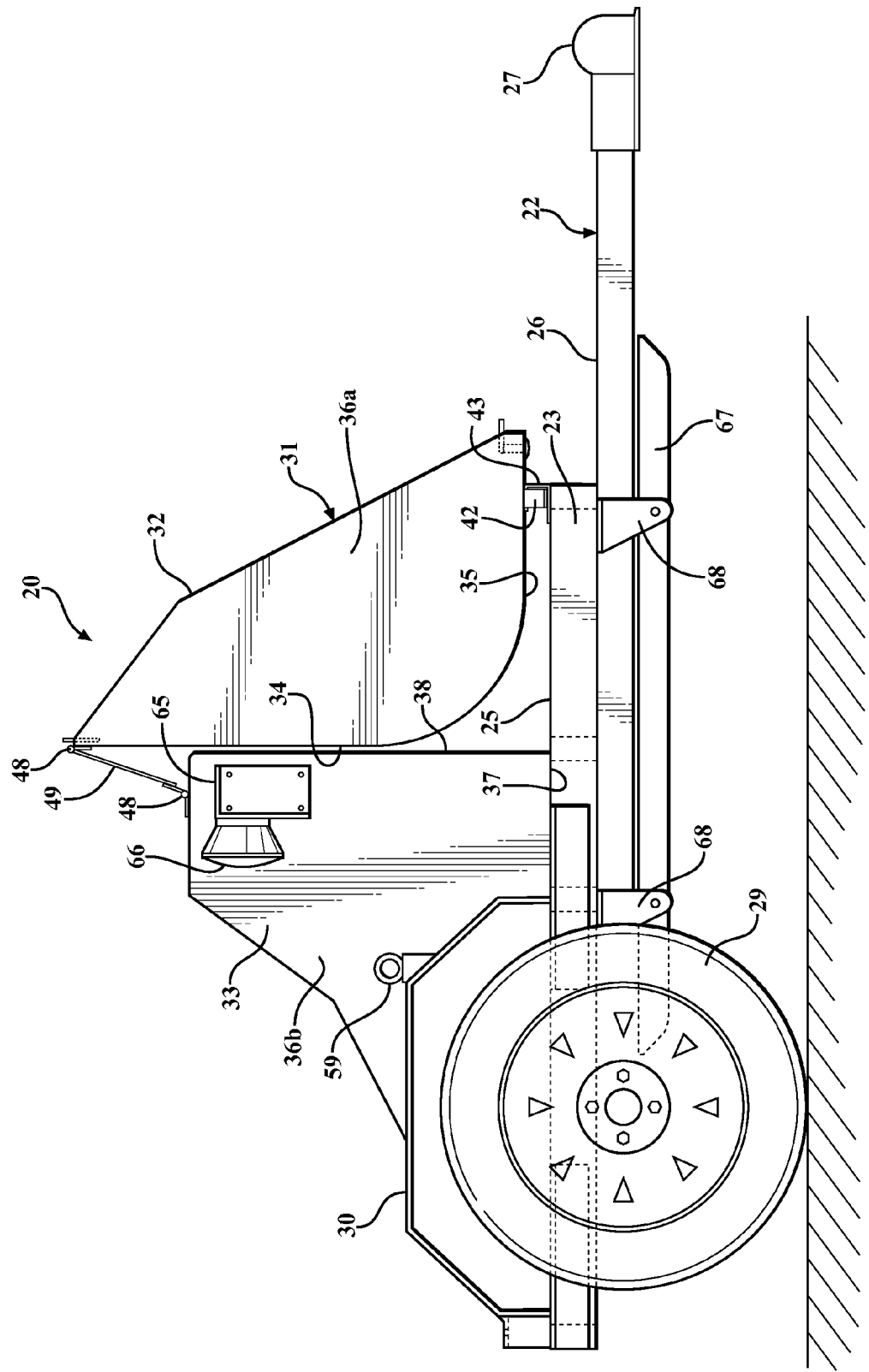
FIG. 6 is a side elevation view of the exemplary embodiment of the motorcycle trailer in the towing configuration.
Figure 7:
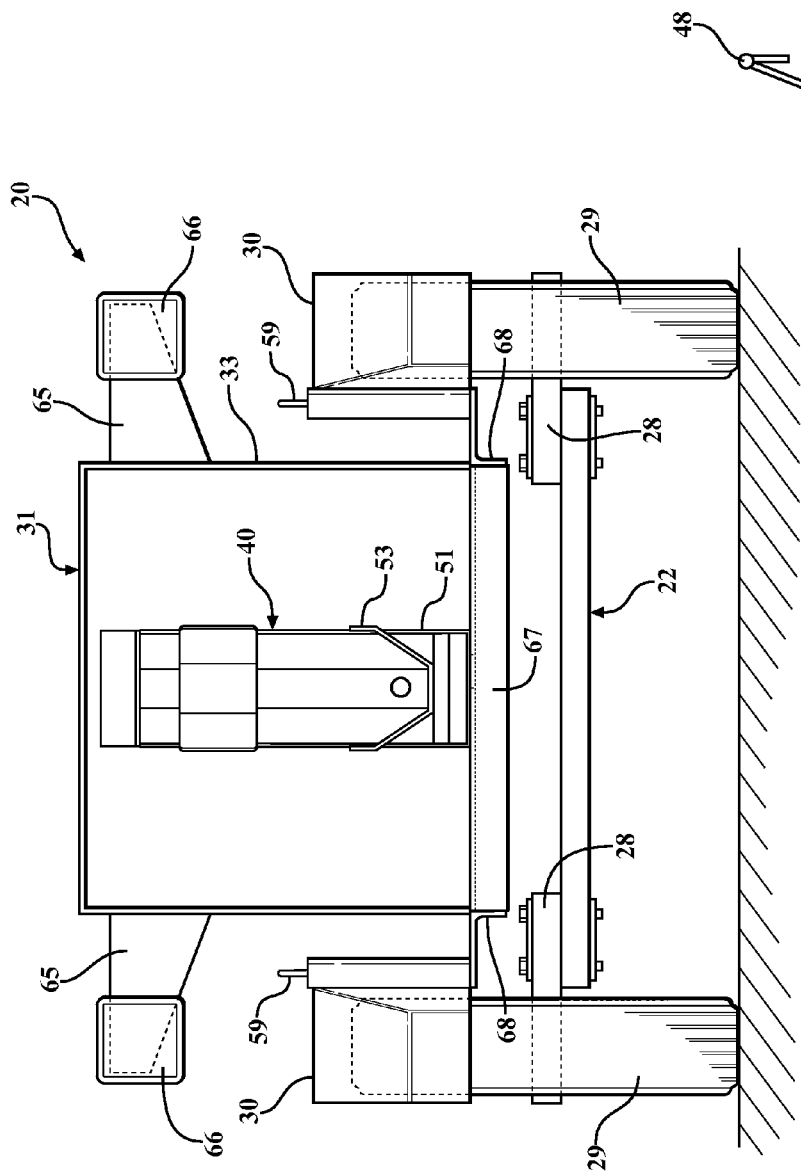
FIG. 7 is a rear elevation view of the exemplary embodiment of the motorcycle trailer in the towing configuration.

As explained above, the cargo bay 31 is convertible between at least a cargo trailer configuration and a towing dolly configuration. As shown in FIG. 3, in the cargo trailer configuration, the top and bottom portions 32, 33 are closed against one another to present a primary cargo space for storing cargo. As shown in FIG. 6, in the towing dolly configuration, the top portion 32 is moved away from the top of the bottom portion 33 to expose the interior of the bottom portion 33. A front tire 39 of the disabled motorcycle 21 can then be positioned in the interior of the bottom portion 33. When positioned in the interior of the bottom portion 33, the front tire 39 is elevated relative to the rear tire, which is allowed to spin freely. The trailer 20 further includes at least one connection device 40, 41 for securing the motorcycle 21 to be towed to the frame 22, as will be discussed in greater detail below.

In the trailer 20 of the exemplary embodiments, the top portion 32 is hingedly connected to the bottom portion 33 to allow the cargo bay 31 to be quickly adjusted between the cargo and towing configurations. To convert the cargo bay 31 from the cargo trailer configuration, a user simply rotates the top portion 32 so that the back wall 35 of the top portion 32 rests on the floor 25, as best shown in FIG. 6. It should be appreciated that the cargo bay 31 could alternatively be adjusted between the cargo and towing configurations through a number of different ways. For example, the top portion 32 of the cargo bay 31 could be on a track that guides it between the positions shown in FIGS. 3 and 6. Alternatively, the top portion 32 could be manually removed from the bottom portion 33 and placed in front of the bottom portion 33.

Figure 9B:
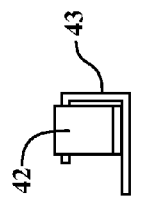
FIGS. 9A and 9B show fragmentary front and side views, respectively, of a handle and a cover holder of the exemplary embodiment of the motorcycle trailer.
Figure 9A:

In the trailer 20 of the exemplary embodiments, the back wall 35 of the top portion 32 includes a handle 42. A handle receiver 43 is disposed on the floor 25 in front of the bottom portion 33, and the handle receiver 43 is shaped to receive and engage the handle 42 of the top portion 32 when the cargo bay 31 is in the towing dolly configuration, as best shown in FIGS. 9A and 9B.

As shown in FIG. 1, a cam lock 46 including a latch 47a is disposed on the back wall 35 of the top portion 32. When the cargo bay 31 is in the cargo trailer configuration, the cam lock 46 can be turned with a key to rotate the latch 47a so that the latch 47a engages a slot 47b in the bottom portion to lock the top and bottom portions 32, 33 together.

Figure 18:
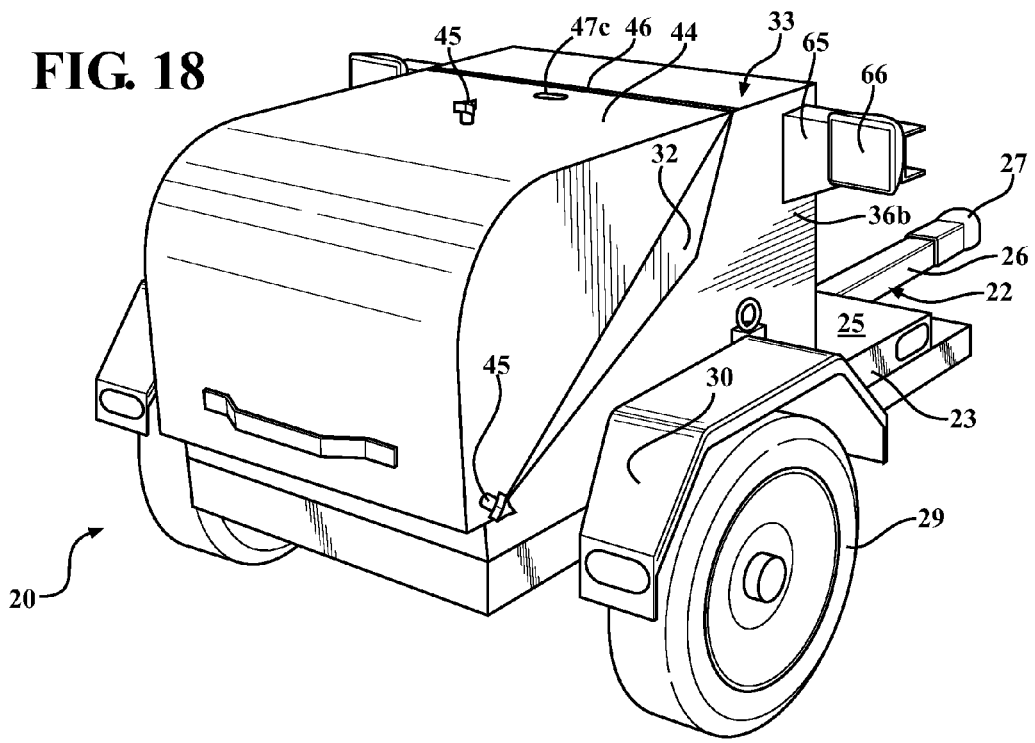
FIG. 18 is a perspective rear view of the exemplary embodiment of the motorcycle trailer in the cargo configuration and including a lid.
Figure 19:
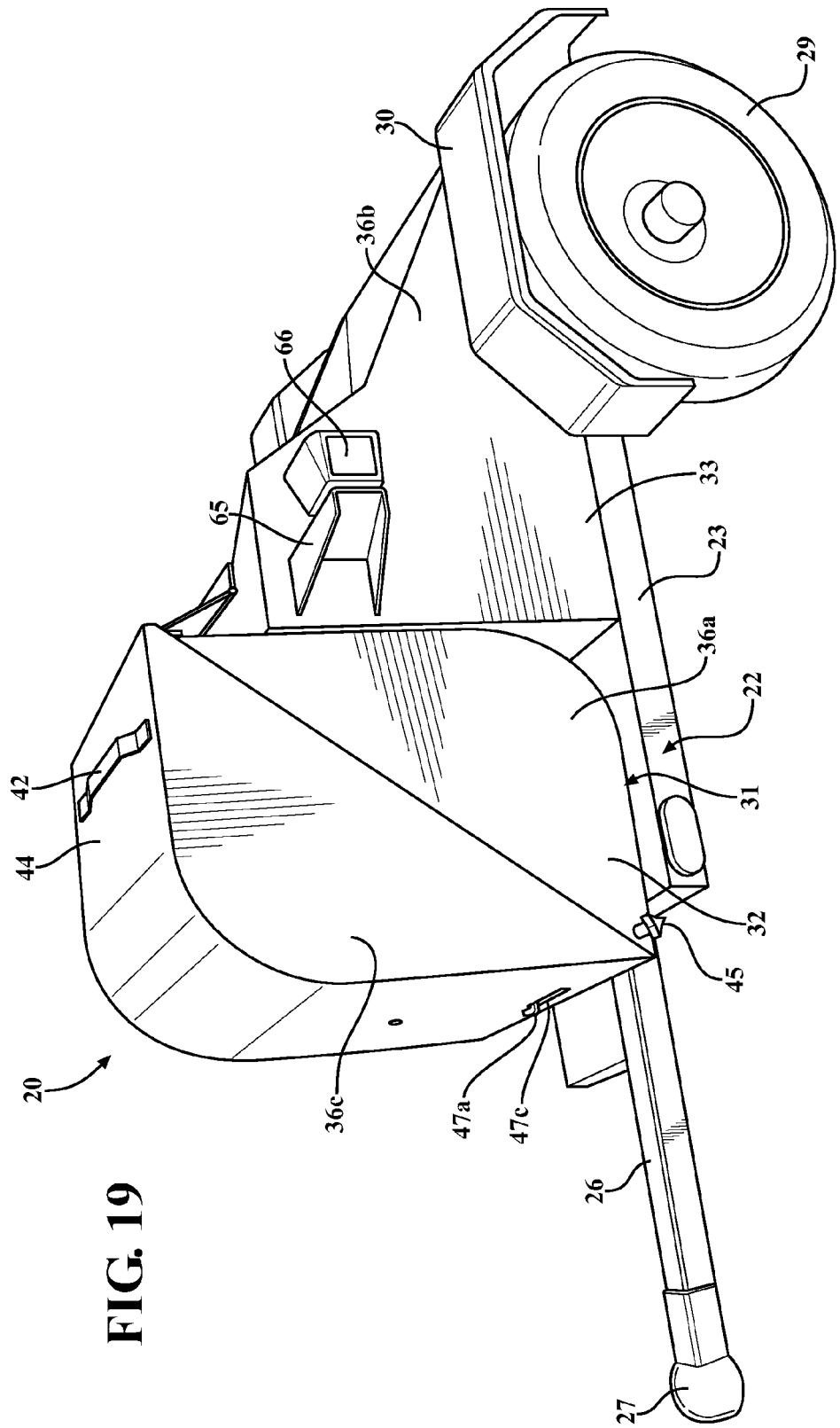
FIG. 19 is a perspective side view of the exemplary embodiment of the motorcycle trailer in the towing configuration and including a lid.

The trailer 20 may additionally include a lid 44, as shown in FIGS. 18 and 19, for storing cargo when the cargo bay 31 is in the towing dolly configuration. Specifically, as shown in FIG. 19, when the cargo bay 31 is in the towing dolly configuration, the lid 44 is positioned onto the top portion 32 to present an auxiliary cargo space. In order to save space and preserve the external appearance of the trailer 20, the lid 44 of the second exemplary embodiment is shaped generally similar to the top portion 32 of the cargo bay 31 and is nested onto the top portion 32 when the cargo bay 31 is in the cargo trailer configuration, as shown in FIG. 18.

Figure 20:
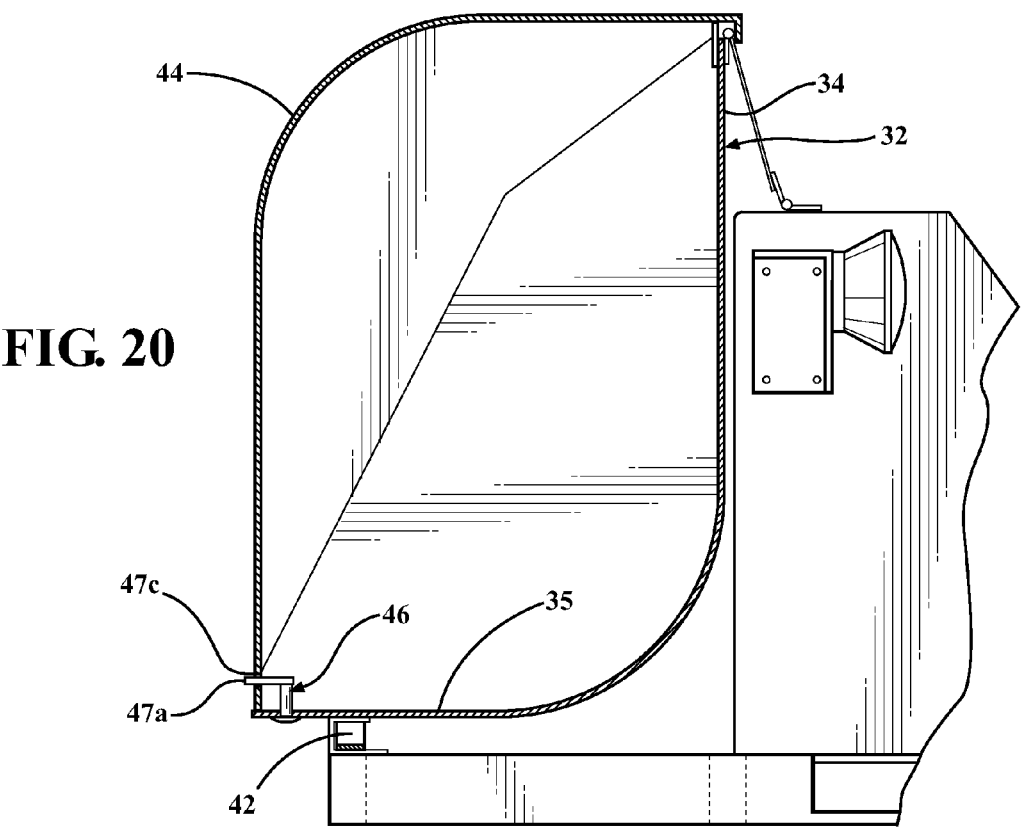
FIG. 20 is a cross-sectional view of the top portion and the lid joined together to present an auxiliary cargo space for storing cargo when the cargo bay is in the towing configuration.

As shown in FIG. 20, one side of the lid 44 defines a front lip for engaging the top portion 32 to secure the lid 44 to the top portion 32 when the cargo bay 31 is in the towing dolly configuration. The lid 44 also presents a slot 47b for receiving the latch 47a of the cam lock 46 to lock the top and bottom portions 32, 33 together when the cargo bay 31 is in the towing dolly configuration. On operation, a user secures the lid 44 to the top portion 32 by sliding the front lip into the position shown in FIG. 20 then turning the cam lock 46 to engage the latch 47a with the slot 47b of the lid 44. Thus, the same lock 46 is used to lock both the primary cargo space and the auxiliary cargo space. It should be appreciated that other locking devices and mechanisms could be used to lock the cargo bay 31.

The lid 44 and top portion 32 each present a plurality of threaded apertures aligned with one another, and a bolt 45 is threaded through each set of aligned apertures to secure the lid 44 to the top portion 32 when the cargo bay 31 is in the cargo trailer configuration. It should be appreciated that straps, latches or any other types of connectors could alternatively be used to secure the lid 44 to the top portion 32. The front wall 38 of the bottom portion 33 of the cargo bay 31 also defines a threaded aperture. When the cargo bay 31 is in the towing dolly configuration with the top portion 32 in front of the bottom portion 33, one of the apertures of the top portion 32 is aligned with the threaded aperture on the bottom portion 33. One of the bolts 45 can then be used to secure the top portion 32 in this position when the cargo bay 31 is in the towing dolly configuration. As shown in FIG. 19, when the lid 44 is positioned onto the top portion 32, the apertures on the opposing side walls 36a of the top portion 32 align with the apertures on the opposing side walls 36c of the lid 44. At least one bolt 45 is threaded through the aligned apertures to further secure the lid 44 to the top portion 32 and enclose the auxiliary cargo space.

A handle 42 is disposed on the back of the lid 44 for facilitating movement of the lid 44 between the two positions. In other words, a person can use the handle 42 to easily move the lid 44 from the position of FIG. 18 with the cargo bay 31 in the cargo trailer configuration to the position of FIG. 19 with the cargo bay 31 in the towing dolly configuration and vice versa.

Figure 10:
FIG. 10 is a fragmentary enlarged side view of a pair of hinges of the exemplary embodiment of the motorcycle trailer.
Figure 8:
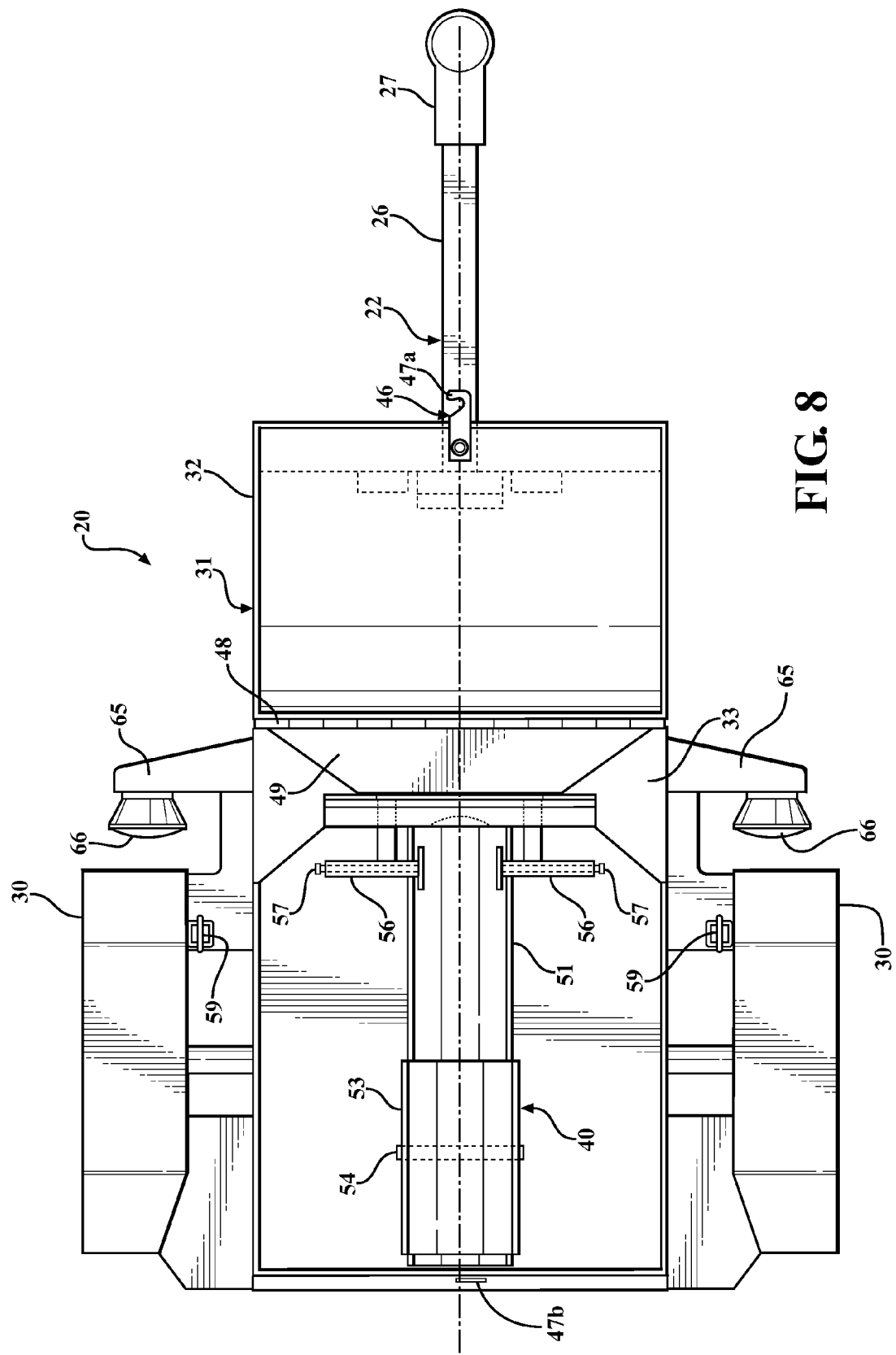
FIG. 8 is a top elevation view of the exemplary embodiment of the motorcycle trailer in the towing configuration.
Figure 11:
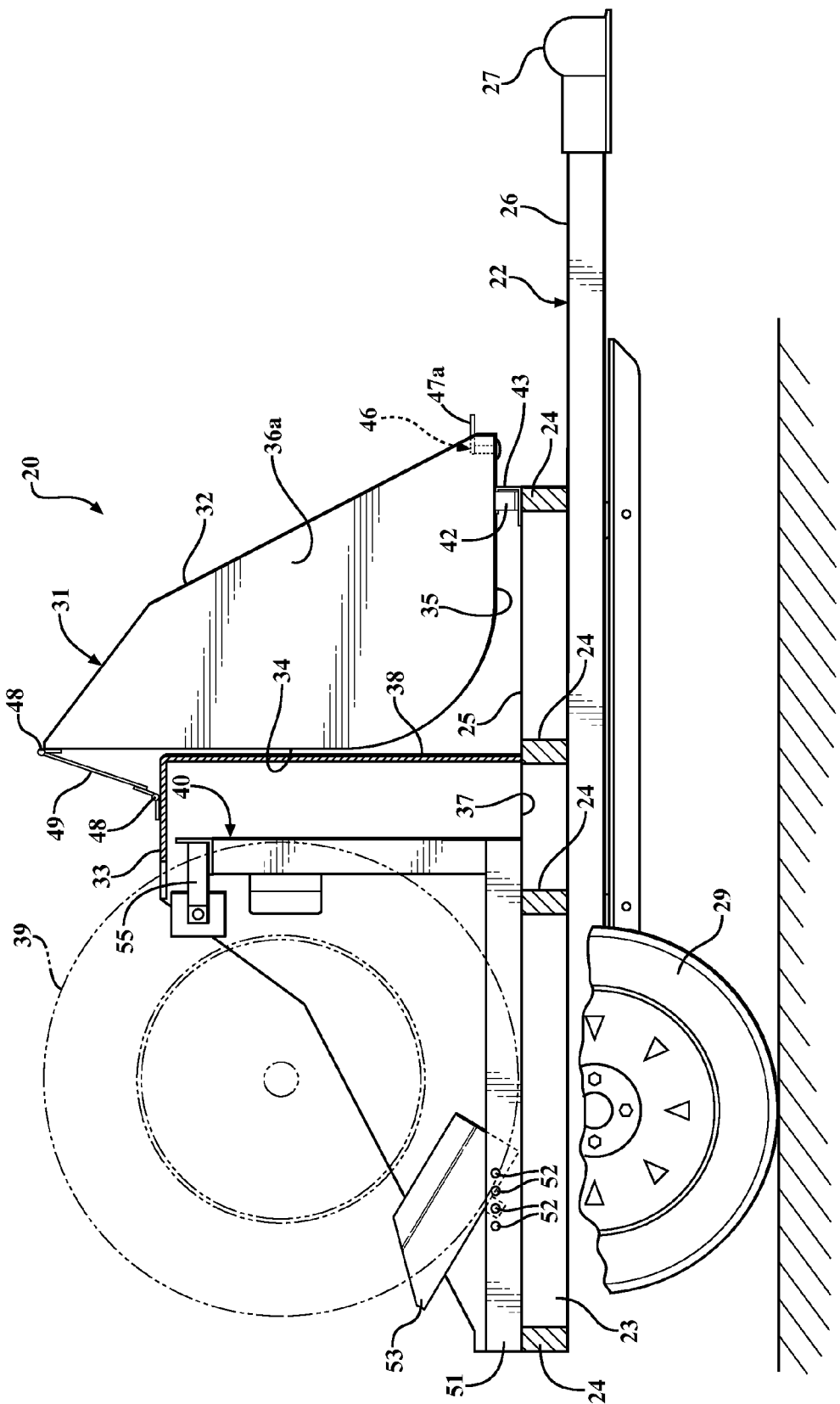
FIG. 11 is a side elevation view shown partly in cross-section of the exemplary embodiment of the motorcycle trailer in the towing configuration and with a front tire of a motorcycle secured to a mounting shoe.
Figure 13B:
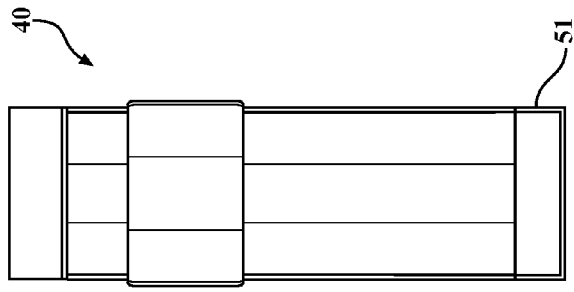
FIGS. 13A and 13B show side and front views, respectively, of the mounting shoe of the exemplary embodiment.
Figure 13A:
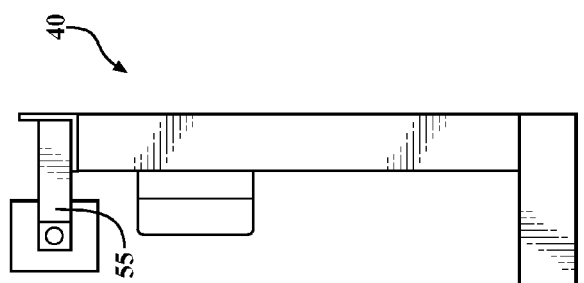
Figure 14:
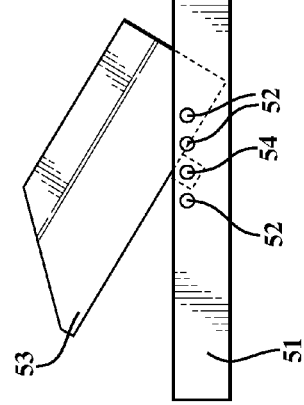
FIG. 14 is a side view of an entry bracket of the exemplary embodiment of the motorcycle trailer.
Figure 15:
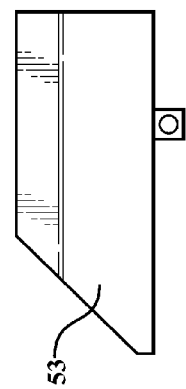
FIG. 15 is a front view of a wheel brace of the exemplary embodiment of the motorcycle trailer.

As shown in FIG. 10, the exemplary embodiments each include a pair of hinges 48 connected to one another. Each hinge 48 has at least one hinge plate 49 having a generally trapezoidal shape. One of the hinges 48 is hingedly connected to the top of the bottom portion 33, and the other hinge 48 is hingedly connected to the top wall 34 of the top portion 32. The hinges 48 allow for the top portion 32 of the cargo bay 31 to be rotated between position shown in FIG. 3 with the cargo bay 31 in the cargo trailer configuration and the position shown in FIG. 6 with the cargo bay 31 in the towing dolly configuration. The trapezoidal shape of the hinge plates 49 provides additional room in the bottom portion 33 for receiving the front tire 39 of the disabled motorcycle 21 when the cargo bay 31 is in the towing dolly configuration.

The trailer 20 includes at least one connection device 40, 41 for securing the disabled motorcycle 21 to the trailer 20. In the exemplary embodiment, there are two different connection devices 40, 41: a mounting shoe 40 for securing the front tire 39 of the motorcycle 21 to the trailer 20 and a pair of fasteners 41 for securing the handlebars 50 of the motorcycle 21 to the trailer 20. In the exemplary embodiments, the mounting shoe 40 is hidden from view in the primary cargo space when the cargo bay 31 is in the cargo trailer configuration to give the trailer 20 a more simple and aerodynamic exterior.

In the exemplary embodiments, the mounting shoe 40 includes a base channel 51 extending along the bottom wall 37 of the bottom portion 33 for guiding the front tire 39 of the disabled motorcycle 21 into a towing position, which is shown in FIG. 1. The base channel 51 includes at least one pin hole 52 and an entry bracket 53. The entry bracket 53 is pivotally and releasably secured to the base channel 51 with a pin 54 extending through the pin hole 52. The entry bracket 53 can rotate about the pin 54 between a flat orientation and an inclined orientation. When the entry bracket 53 is in the flat orientation, the front tire 39 of the motorcycle 21 to be towed can be freely rolled over the entry bracket 53 and into the towing location. Once the motorcycle 21 is in the towing location, the entry bracket 53 is then pivoted into the inclined position, as shown in FIG. 12A, to embrace the back of the front tire 39 and prevent it from rolling backward. In the exemplary embodiments, the base channel 51 includes a plurality of pin holes 52 spaced longitudinally from one another, and the pin 54 is a quick release pin 54. Thus, the entry bracket 53 can be quickly repositioned to accommodate the front tire 39 of virtually any motorcycle 21.

In the exemplary embodiments, the mounting shoe 40 also includes a wheel brace 55, which is disposed on the interior surface of the front wall 38 of the bottom portion 33. The wheel brace 55 includes a pair of laterally extending sleeves 56, and each sleeve 56 threadedly supports a screw 57 having a pad 58 at its inner end. The screws 57 can be twisted relative to the sleeves 56 to move the pads 58 inwardly for gripping the sidewalls of the front tire 39 of the disabled motorcycle 21 or outwardly to release the front tire 39. The wheel brace 55 of the exemplary embodiments is beneficial because it can accommodate the front tire 39 of virtually any motorcycle 21.

Figure 17:
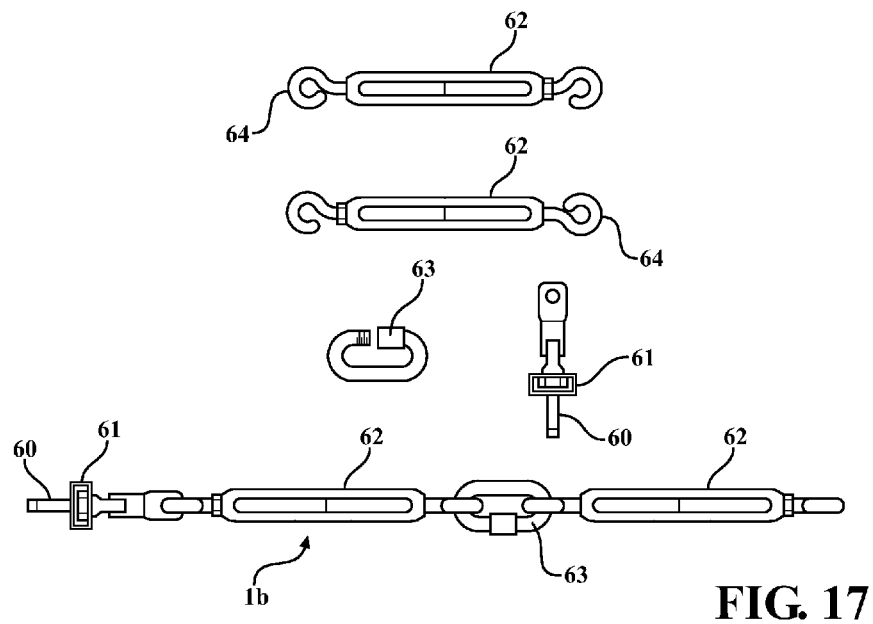
FIG. 17 is a front view of a fastener of the exemplary embodiment along with the individual parts of the fastener.

The frame 22 of the exemplary embodiment also includes a pair of hooks 59, which are disposed on opposite sides of the bottom portion 33 of the cargo bay 31. The fastener 41 securely connects these hooks 59 to the handlebars 50 of the disabled motorcycle 21 to further secure the motorcycle 21 to the trailer 20. Preferably, the fastener 41 is at least partially rigid in both compression and tension to limit the amount that the disabled motorcycle 21 tilts, or leans, when going around curves. As shown in FIG. 17, the exemplary embodiment of the fastener 41 includes a top split collar 60, a pivoting joint 61, a pair of turnbuckles 62, and a split screw link 63. This configuration has been found to be optimally rigid in compression in addition to tension. Additionally, all of the components are of metal, so there is little to no risk of the fastener 41 stretching or otherwise deforming when the disabled motorcycle 21 is towed around a turn or over a rough surface. It should be appreciated that other fasteners 41, including ropes and chains, could alternately be used. When the cargo bay 31 is in the cargo trailer configuration, the fasteners 41 can be conveniently stowed in the primary cargo space.

The top split collar 60 of the fastener 41 is preferably lined with a polymeric material for protecting the handlebars 50 of the disabled motorcycle 21. The pivoting joint 61 is attached to the top split collar 60 for allowing the fastener 41 to accommodate motorcycles 21 having handlebars 50 with various orientations. The turnbuckles 62 are interconnected to one another through the split screw link 63. The turnbuckles 62 extend between and connect the pivoting joint 61 to the hook 59 of the trailer 20. One end of at least one of the turnbuckles 62 defines an eyehook 64, which mates with the pivoting joint 61. This is preferred over a hook-shaped end mating with the pivoting joint 61, because if there is any tilting or leaning of the disabled motorcycle 21, e.g. when going through a turn, the eyehook 64 will not detach from the pivoting joint 61. Once the disabled motorcycle 21 is positioned in the towing location on the trailer 20, as shown in FIG. 1, each fastener 41 is connected to one of the hooks 59 and to the handlebars 50 of the motorcycle 21. The turnbuckles 62 can then be manually spun to shorten the fastener 41 and more tightly connect the motorcycle 21 to the frame 22. When the turnbuckles 62 are spun in one direction, the fastener 41 shortens, and when the turnbuckles 62 are spun in the other direction, the fastener 41 lengthens. Thus, the fastener 41 can be quickly adjusted to accommodate virtually any motorcycle 21.

The exemplary embodiments also include a pair of side protrusions 65 extending outwardly from the opposing side walls 36 of the bottom portion 33 of the cargo bay 31. A license plate and/or a signal lamp 66 can be disposed on each of these protrusions. The placement of the lamps 66 on the side protrusions 65 is advantageous because they can be seen from behind the trailer 20, even when a motorcycle 21 is being towed.

Additionally, to facilitate the placement of a motorcycle 21 on the trailer 20, a ramp 67 is removably disposed below the floor 25 of the frame 22. In the exemplary embodiment, the ramp 67 is supported by a plurality of support brackets 68 each connected to one of the side bars 23 or the cross-bars 24 of the frame 22. The ramp 67 can be quickly detached from the support brackets 68 and positioned behind the trailer 20 on an incline with one end of the ramp 67 engaging the back of the trailer 20 and the other end resting on the ground. The disabled motorcycle 21 can then be manually walked up the ramp 67 into the towing location shown in FIG. 1.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A dual-purpose trailer convertible between a cargo trailer configuration for storing cargo and a towing dolly configuration for towing a motorcycle having a front wheel, comprising:

a cargo bay presenting a first portion and a second portion enclosable against one another to present a primary cargo space when said trailer is in said cargo trailer configuration;

one of said first and second portions being movable relative to the other portion to present an open interior for receiving and elevating the front wheel of the motorcycle when said trailer is in said towing dolly configuration;

at least one connection device for securing the motorcycle to said trailer; and wherein one of said first and second portions presents an auxiliary cargo space for storing cargo when said trailer is in said towing dolly configuration.

2. The trailer as set forth in claim 1 wherein said first portion of said cargo bay is a top portion and said second portion of said cargo bay is a bottom portion and wherein said top portion is disposed on top of said bottom portion to present said primary cargo space when said cargo bay is in said cargo trailer configuration.

3. The trailer as set forth in claim 2 wherein said top portion of said cargo bay is hingedly connected to said bottom portion for allowing said top portion to be rotated in front of said bottom portion to expose said interior of said cargo bay in said towing dolly configuration.

4. The trailer as set forth in claim 3 further including a hinge plate extending between said top and bottom portions and including a first hinge interconnected with said top portion and a second hinge interconnected with said bottom portion.

5. The trailer as set forth in claim 2 further including a lid for engaging said top portion when said cargo bay is in said towing configuration to present an auxiliary cargo space.

6. The trailer as set forth in claim 5 further including a lock disposed on said top portion for locking said top portion to said bottom portion when said cargo bay is in said cargo trailer configuration and for locking said top portion to said lid when said cargo bay is in said towing dolly configuration.

7. The trailer as set forth in claim 6 wherein said lock is a cam lock having a latch and said bottom portion and lid each present a slot for receiving said latch.

8. The trailer as set forth in claim 1 further including a frame supporting said cargo bay and wherein said connection device includes at least one fastener interconnected with said frame for attachment to handlebars on the motorcycle.

9. The trailer as set forth in claim 8 wherein said fastener is adjustable for accommodating motorcycles of various sizes.

10. The trailer as set forth in claim 9 further including a pair of fasteners and wherein each of said fasteners includes at least one turnbuckle for adjusting the length of said fasteners to secure the motorcycle from tilting relative to said trailer during towing.

11. The trailer as set forth in claim 10 wherein each of said fasteners includes a pair of turnbuckles.

12. The trailer as set forth in claim 11 wherein each of said fasteners further includes a top split collar lined with a polymeric material for attachment to the handlebars of the motorcycle and a pivoting joint interconnecting said top split collar with one of said turnbuckles.

13. The trailer as set forth in claim 1 wherein said connection device includes a mounting shoe disposed in said cargo bay for securing the front wheel of the motorcycle when said cargo bay is in said towing dolly configuration.

14. The trailer as set forth in claim 13 wherein said mounting shoe includes a base channel presenting at least one pin hole and an entry bracket.

15. The trailer as set forth in claim 14 further including a pivot pin releasably securing said entry bracket to said base channel for allowing said entry bracket to pivot between a flat position for allowing the front tire of the motorcycle to be rolled into a towing location in said cargo bay and an inclined position for restricting movement of the motorcycle relative to said trailer.

16. A dual-purpose trailer convertible between a cargo trailer configuration for storing cargo and a towing dolly configuration for towing a motorcycle having a front wheel, comprising:

a frame including a tongue extending in a forward direction to a distal end;

a receiver disposed at said distal end of said tongue for connecting said frame to a vehicle;

a pair of wheels rotatably mounted on said frame;

a cargo bay having an interior and including a top portion and a bottom portion;

said top portion being hingedly connected to said bottom portion for allowing rotation of said top portion between said cargo trailer configuration with said top and bottom portions engaging one another to present an enclosed primary cargo space and a towing dolly configuration with said top portion being rotated to a position in front of said bottom portion and presenting an auxiliary cargo space;

a lid having a profile substantially similar to said top portion of said cargo bay for nesting onto said top portion when said cargo bay is in said cargo trailer configuration and engaging said top portion in front of said bottom portion to enclose said auxiliary cargo space when said cargo bay is in said towing dolly configuration;

at least one hinge interconnecting said top and bottom portions of said cargo bay;

at least one connection device for securing the motorcycle to be towed to said trailer when the front tire of the motorcycle to be towed is elevated in said interior of said bottom portion of said cargo bay;

said connection device including a mounting shoe for attachment to the front wheel of a motorcycle to be towed when said cargo bay is in said towing dolly configuration; and said connection device further including a fastener securely connected to said frame for engaging the handlebars of the motorcycle to be towed and being adjustable for accommodating various sized motorcycles.

17. A method for converting a motorcycle trailer from a cargo trailer configuration to a towing dolly configuration, comprising the steps of:

providing a cargo bay having a first portion and a second portion enclosed against one another to define a primary cargo space;

storing cargo in the primary cargo space;

opening first and second portions to expose the interior of the cargo bay and to present an auxiliary cargo space in one of the first and second portions;

removing cargo from the primary cargo space of the cargo bay;

positioning a front wheel a motorcycle in the interior of the cargo bay to elevate the front wheel;

storing the cargo in the auxiliary cargo space in one of the first and second portions; and securing the motorcycle to the trailer for towing.

18. The method as set forth in claim 17 wherein said step of opening the cargo bay is further defined as opening the cargo bay to expose a mounting shoe in the interior of the cargo bay.

19. The method as set forth in claim 17 wherein said step of securing the motorcycle to the trailer is further defined as securing the motorcycle to the trailer with an adjustable fastener.

20. The method as set forth in claim 19 wherein the adjustable fastener includes at least one turnbuckle and further including the step of spinning the turnbuckles to adjust the length of the fastener.

21. The method as set forth in claim 17 wherein the cargo bay includes a top portion and a bottom portion and wherein said step of opening the cargo bay is further defined as rotating the top portion relative to the bottom portion to expose the interior of the cargo bay.

22. The method as set forth in claim 21 further including said step of positioning a lid on the top portion to define an auxiliary cargo space for storing cargo when the interior of the cargo bay is exposed.

23. The method as set forth in claim 17 further including the steps of positioning a ramp on the back of the trailer and rolling the front wheel of the motorcycle into the interior of the cargo bay.

\* \* \* \* \*